United States Patent Office 3,407,480
Patented Oct. 29, 1968

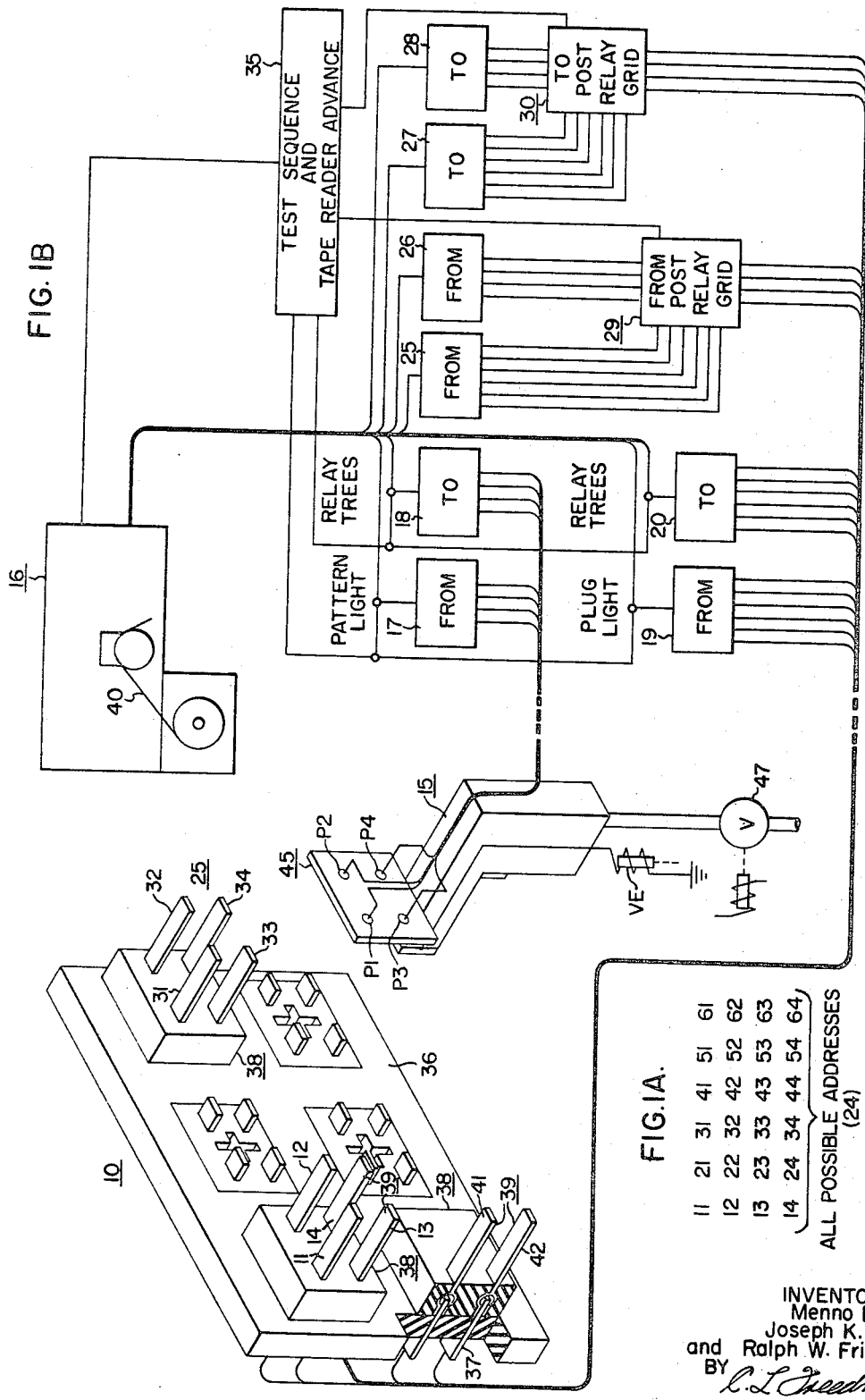

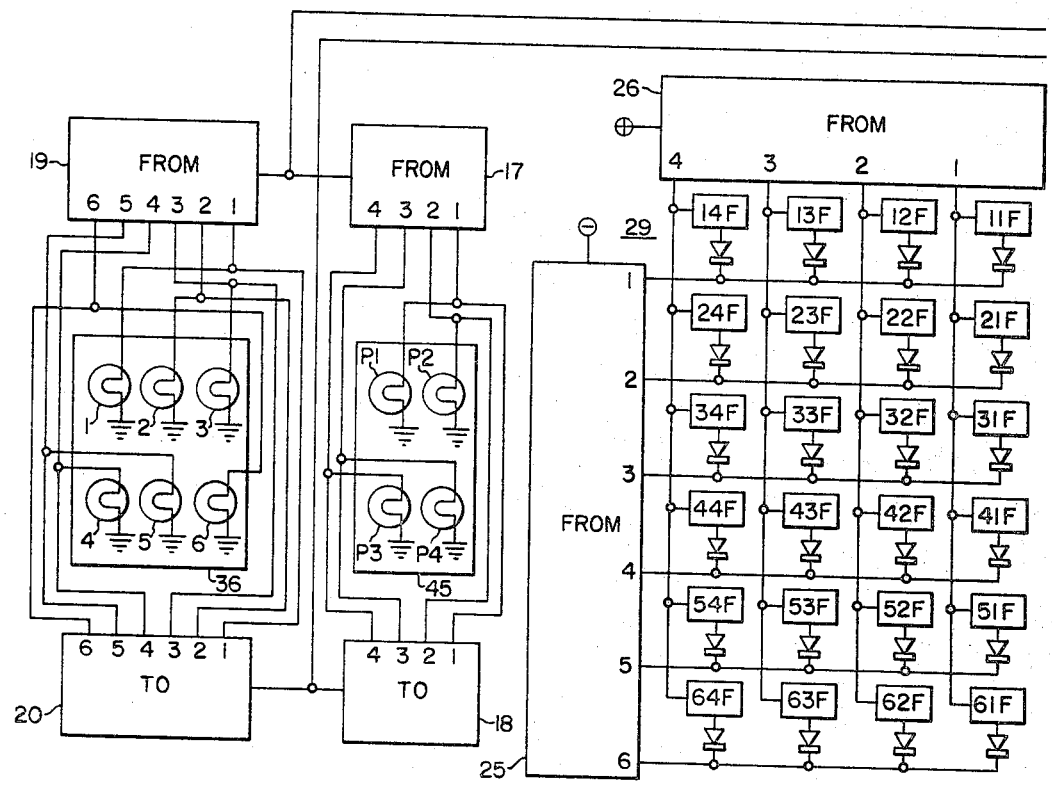
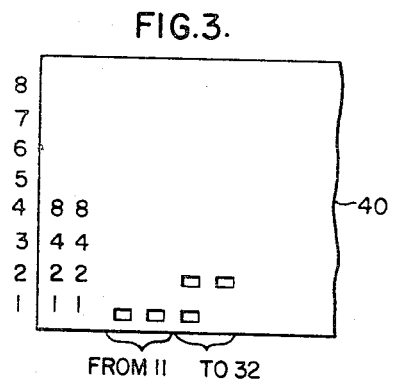
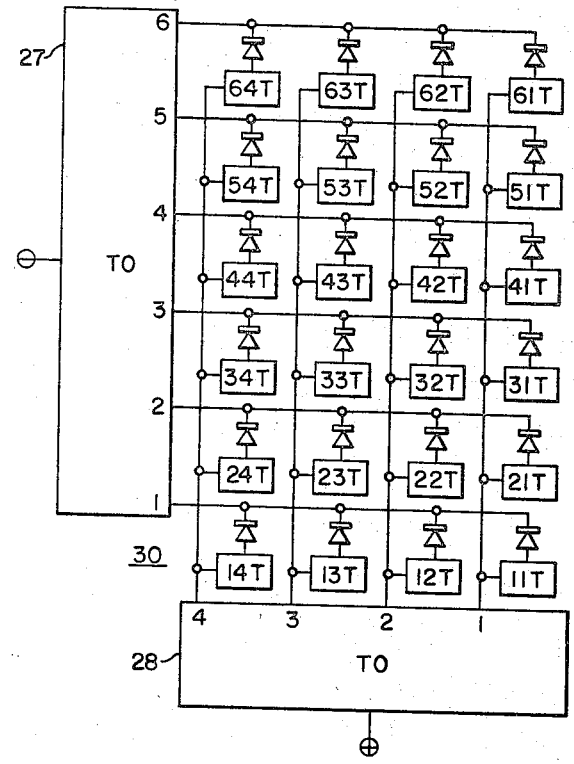
FIG.2A.
FIG.3.

3,407,480
WIRING AND TESTING OF CONTROLLER HARNESS
Menno E. Hill, Rutherford, Joseph K. Kraft, Verona, and Ralph W. Friedrich, Jersey City, N.J., assignors to Westinghouse Electric Corporation, Pittsburgh, Pa., a corporation of Pennsylvania
Filed Apr. 5, 1965, Ser. No. 445,538
16 Claims. (Cl. 29—593)

ABSTRACT OF THE DISCLOSURE

Removable connectors are laid out in a pattern conforming to mating connectors of an electrical system to be wired. Lamps are arranged in two groups to indicate the specific connector and the specific terminal in a connector to be wired. A supervisory device successively steps to indicate one at a time each terminal to be connected. Energizing means is arranged to energize a terminal connecting tool only if the tool is applied to the indicated terminal. The supervisory device tests continuity of each pair of terminals and its connecting wire before stepping to the next terminal.

---

This invention relates, generally, to wiring methods and apparatus and, more particularly, to the wiring and testing of harness for control apparaus such as, for example, elevator controllers.

Prior methods of wiring control apparatus are relatively slow and expensive. A wireman must set up elementary diagrams, read these diagrams, choose the wire (both size and color), and find the terminal on the apparatus to connect the wire. A large part of his time is required to interpret the diagrams, and mistakes can be made because he must remember the information he has read. After the wiring is completed it must be tested for errors.

An object of this invention is to provide for preforming a wire harness which can be plugged into control apparatus after it is formed.

A more specific object of the invention is to provide a combined instructing and testing system for making a preformed wire harness on a harness board.

Another object of the invention is to provide visual instructions for connecting both ends of each wire in the harness to proper terminals on the board.

A further object of the invention is to provide for automatically testing the connections for each wire as they are made.

Still another object of the invention is to provide a predetermined time limit for the making of each wiring connection.

A still further object of the invention is to stop the wiring procedure in case a wrong connection or a poor connection is made.

Other objects of the invention will be explained fully hereinafter or will be apparent to those skilled in the art.

In accordance with one embodiment of the invention, a harness board is provided having terminals thereon for receiving removable plug connectors to which wire harness connections are made. After completion, the harness is removed from the harness board and plugged into components in an apparatus cabinet. By means of a punched tape, a tape reader, control apparatus and circuitry, a light adjacent the plug connector to be wired is turned on, a light on a pattern board on a wiring tool is turned on, and a voltage is applied to the post to be wired. When the wiring tool touches the correct post, the tool is energized for a preset time during which the wireman may connect one end of a wire to the post. After the time delay has expired, instructions for connecting the other end of the wire are presented in the same manner. After the final termination, a continuity test is run between the two points. Both ends of the wire must be connected to the correct posts before the tape reader will advance to the next information.

For a better understanding of the nature and objects of the invention, reference may be had to the following detailed description, taken in conjunction with the accompanying drawings, in which:

FIGURES 1A and 1B constitute a diagrammatic view of the apparatus for a wiring system embodying principal features of the invention;

FIGS. 2A and 2B constitute a wiring diagram for the apparatus utilized in the wiring system;

FIG. 3 is a view of a portion of the coded tape;

Figure 2B:
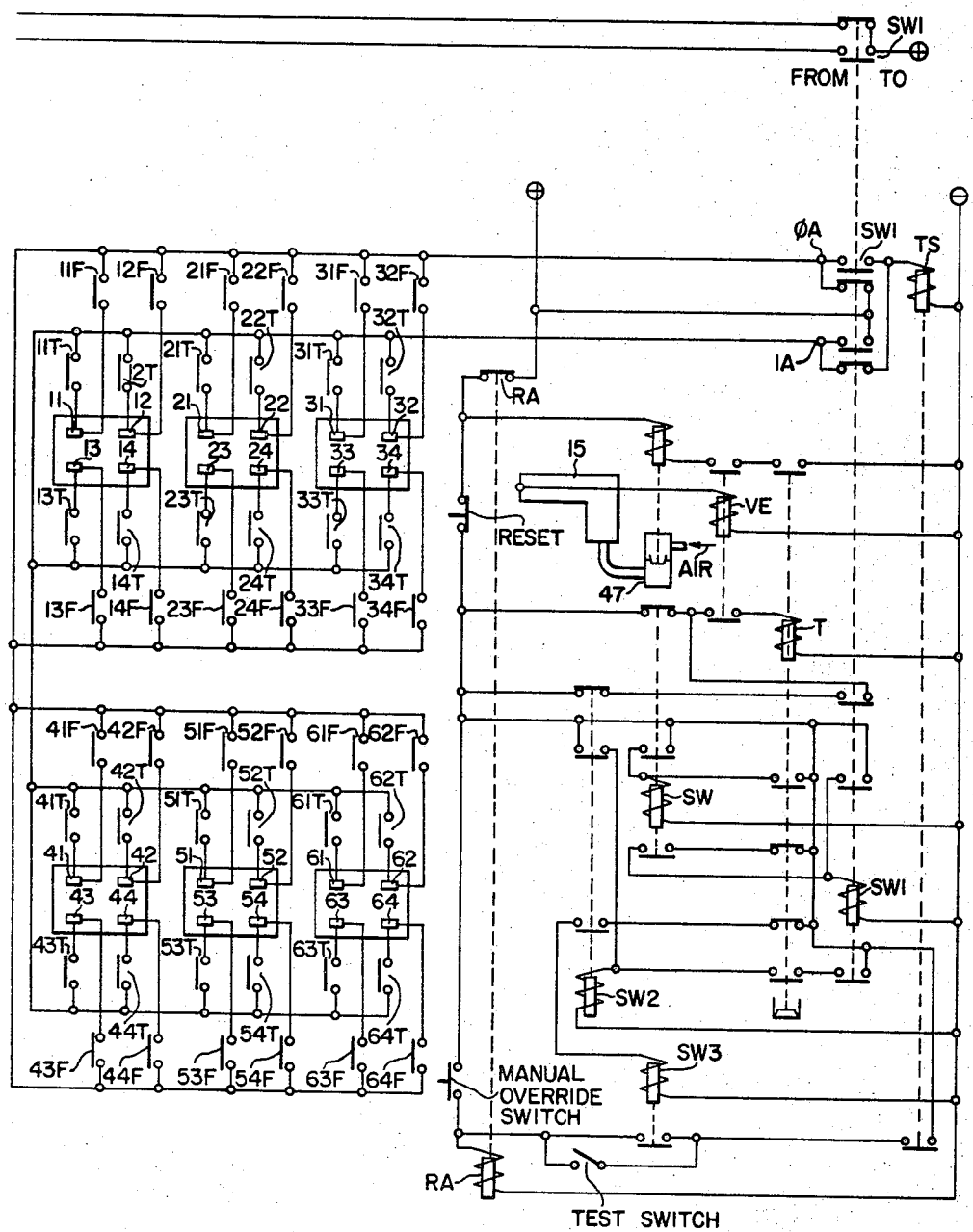

Referring to the drawings, and particularly to FIGS. 1A and 1B, the system shown therein comprises a harness board 10, a wiring gun or tool 15, a tape reader 16, decoding units 17 to 20 and 25 to 28, relay grids 29 and 30, and control apparatus 35. The harness board 10 includes a panel 36 having a plurality of groups of terminals 37 mounted on the rear of the panel and extending through the panel for receiving removable plug connectors 38 carrying terminal posts 39 each having a bifurcated end for engaging a terminal 37. Terminals of other commercially available types may be utilized.

Each group of terminals 37 corresponds to a group of terminals of the relays and other control components of a control system, for example an elevator control system. In order to simplify the present drawings and description only four terminals are shown in each group and only six groups are shown on the board 10. Each plug connector may have a desired number of terminal posts which may be arranged in a predetermined pattern. As many groups of terminals and plug connectors as required may be provided. The addresses for the 24 terminal posts shown in the present drawing are given in FIG. 1A.

The harness board provides a method of preforming the wiring for the controller components outside the cabinet in which the components are actually mounted. Thus, by making or forming a wire harness having wires connected to the proper terminal posts 39 of the plug connectors 38 and then removing the connectors 38 from the harness board and plugging them into lead terminals on the control components in the cabinet, the wiring information may be transmitted to the wireman in a manner different from the elementary wiring diagrams previously utilized during the wiring of control apparatus.

As shown in FIG. 3, the wiring information may be coded on a punched tape 40 in a binary form. The tape 40 is of a standard commercial type having eight channels. It will be understood that other forms of information carriers, such as a magnetic tape, may be utilized if desired. The information is taken from the tape 40 by the tape reader 16, changed from a binary form to a decimal form by the decoding units and transmitted into the control circuits of the switching units. The switching units, in turn, activate plug indicating lights 1 to 6 on the harness board 10 and lights P1 to P4 on a pattern board 45 to direct the wireman to the correct terminal to be wired.

There need not be a separate light for each terminal, although in some applications it may be desirable. In the present structure, a single light is provided for each plug connector 38. A number of pattern lights corresponding to the number of terminals on each plug are provided on the pattern board 45 which is preferably mounted directly on the wiring tool 15. However, the pattern board may be mounted elsewhere than on the wiring tool. The lights P1 to P4 on the pattern board 45 are mounted in a pattern identical to the geometrical pattern of the terminal posts on the plug connectors 38. Thus, by lighting one of the lights 1 to 6 to indicate the proper plug connector and one of the lights P1 to P4 to indicate the proper terminal 39 on that plug connector, the wireman is directed to a terminal to which a wire is to be connected by means of the wiring tool 15.

The wiring tool or gun 15 is preferably of a type sold under the trade name "Termi-Point," although wire wrapping or even hand soldering could be used. Any method that will attach a wire to a terminal post is acceptable to the system.

Figure 4:
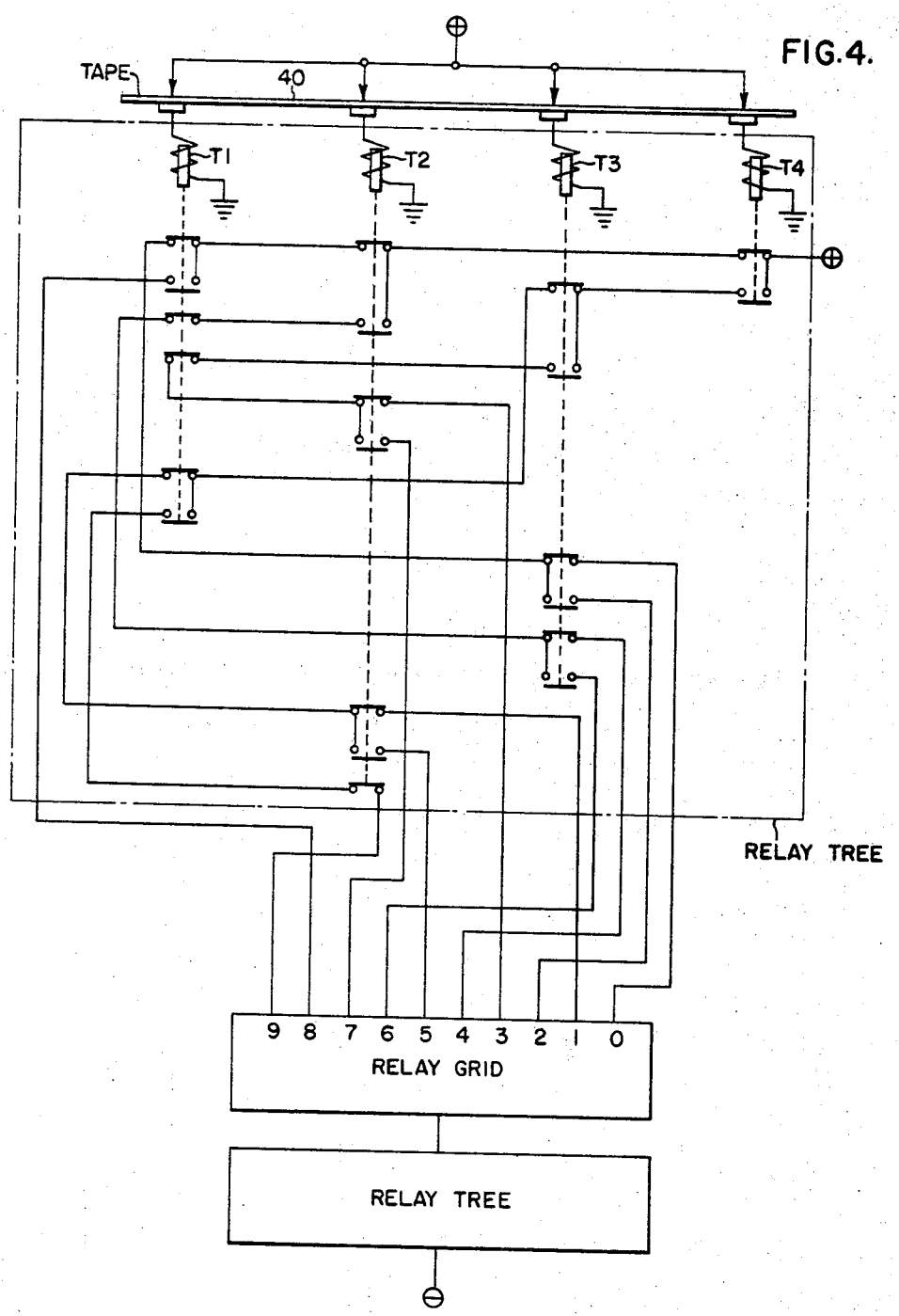
FIG. 4 is a diagrammatic view of a binary to decimal decoding unit (relay tree).

As previously explained, the tape reader 16 and the tape 40 may be of a type commercially available. As shown more clearly in FIG. 4, the decoding units 17 to 20 and 25 to 28 may be relay trees of a type well known in the art, or other logic circuits may be utilized if desired. The function of the decoding units is to change the wiring information from a binary form to a decimal form.

Likewise, the switches or relays utilized in the relay grids 29 and 30 may be of a type which are commercially available. The function of the pattern light relay trees 17 and 18 is to control the energization of the pattern lights P1 to P4 on the pattern board 45. Likewise, the function of the plug light relay trees 19 and 20 is to control the energization of the lights 1 to 6 on the harness board 10. The function of the relay trees 25 to 28 and the relay grids 29 and 30 is to apply voltages of different polarity to the terminal posts 39 to enable continuity tests to be made through the wires to determine if the wires have been properly connected to the correct terminals. The relay grid 29 cooperates with the relay trees 25 and 26, while the relay grid 30 cooperates with the relay trees 27 and 28. Since each wire must be connected to two different terminals or posts, which are designated "From" and "To" in the present system, portions of the apparatus must be duplicated in order that any one post may be either a "From" post or a "To" post., The control apparatus 35 includes control relays and circuitry for controlling the operation of the tape reader 16, the application of the test voltages, and the timing and sequence of the wiring operation. The relays, including a timing relay, and the circuitry may be of a type well known in the art.

A full sized harness board may be divided into a plurality of bays, for example A, B and C. The board may be divided into a plurality of vertical locations, for example 0 to 52. Each bay may be divided into a plurality of horizontal locations, for example 1 to 8. Thus, a particular terminal to be wired may be located by providing an address which includes the vertical location, a bay, a horizontal location in the bay, and the pin number. As explained hereinbefore, the harness board illustrated is reduced in size and the terminal pins or posts are numbered in groups corresponding to the six terminal plugs as shown in FIG. 1A. Assuming that it is desired to run a wire from post "11" to post "32," the address in binary form is shown on the tape 40 in FIG. 3. It will be noted that two columns give the "From" address or "11" and two columns give the "To" address or "32."

The first two columns on the tape as shown in FIG. 3 may be utilized to identify the wire on a wire rack which is to be utilized for making a particular connection. In accordance with the usual practice, wires of different sizes, different insulation and different color may be utilized. Each size, insulation and color combination may be assigned a number which may be identified by the first two columns on the tape. This information may be utilized to cause a light to be lit on the wire rack at a reel containing the wire identified by the number. Thus, the wireman may be informed of the wire to be utilized for connecting the terminals identified on the harness board. The wire information is decoded and transmitted in a manner similar to the terminal information.

Assuming that the tape 40 is placed in the tape reader 16 and advanced to the first wiring information, this information is decoded and causes the following events to take place simultaneously:

(1) A light 1 goes on adjacent the plug connector 38 to be wired,
(2) A light P1 on the pattern board 45 goes on; and
(3) A voltage is applied to the terminal post 11 to be wired.

The wireman notices which plug 38 is indicated. He interprets the pattern light to determine which post 39 on plug is to be wired. When the wiring tool contacts the correct post, in this case post 11, which is energized by a positive voltage, a circuit is established through the wiring tool and the control apparatus to negative or ground to energize the tool to permit its operation to connect one end of the wire to the terminal. The energizing device for the "Termi-Point" apparatus is shown as a solenoid operated air control valve 47. If the tool is not placed on the correct terminal, it does not become energized and it cannot be operated by the wireman. The timing relay and the control equipment function to maintain the tool energizd for a predetermined time during which the wireman may make the wiring connection.

After the time delay has expired, information identifying the terminal, in this case 32, to which the other end of the wire is to be connected is presented in the same manner. Thus, plug light 3 and pattern light P2 are lighted. At the same time, the decoding unit and the control apparatus apply negative voltage to the first terminal and apply positive voltage to the second terminal. Thus, the wiring tool is again energized when it contacts the second terminal and the connection may be terminaled during the predetermined time interval. After the final termination, a continuity test is run between the two points joined by the wire. Both ends of the wire must be correctly connected on the proper posts before the tape reader will advance to the next information.

As shown in FIGS. 2A and 2B, circuits are provided through the test voltage relay grids 29 and 30 and the control apparatus which control the advancement of the tape reader. If the tape reader does not advance, the wireman knows that the wire is not properly connected and reset means are provided to permit the operation to be repeated. When the harness is completed, the plug connectors 38 may be removed from the harness board 10 and plugged into the proper terminals of the apparatus components located in a controller cabinet.

The operation of the system may be understood by referring to FIGS. 2A and 2B. Assuming that the tape reader is at a position designating that a wire be connected from post 11 to post 32, plug light 1 energized through a circuit extending from positive through a contact on relay SW1 (FIG. 2A), a terminal 1 on the relay tree 19 and the light 1 to ground. Pattern light P1 is energized through terminal 1 on the relay tree 17 and the light P1 to ground. The relay 11F of relay grid 29 is energized through a circuit extending from positive through terminal 1 of relay tree 26, the coil of relay 11F, a diode 46, and terminal 1 of relay tree 25 to negative. Positive voltage is applied to post 11 through a circuit extending from positive through a contact SW1 (FIG. 2B) a terminal $\phi$A and contact 11F to the post 11.

When the gun 15 touches the energized post 11, a relay VE picks up. Timing relay T picks up. Relay T has a fast pickup and delay dropout. An electrically operated air valve 47 is opened to admit compressed air to the gun to operate it. Relay SW picks up and locks in. Relay T drops out after a time interval and the air valve 47 closes to shut off the gun. Since the contact of VE is also in series with the air valve, removing the wiring tool before the time cycle has finished will also shut off the gun. This keeps the wireman from touching the correct post and then terminating an incorrect post. Relay SW1 picks up and locks in. Operation of relay SW1 switches "From"

lights to "To" lights. Thus, plug light 3 is energized from positive through contact SW1 which is now in "To" position, terminal 3 on relay tree 20 and the light 3 to ground. Likewise, the pattern light P2 is energized through terminal 2 on relay tree 18 and the light P2 to ground. Relay SW1 also switches the terminal ϕA from positive to negative and the terminal 1A from negative to positive.

At this time, grid relay 32T is energized through a circuit extending from positive through terminal 2 on relay tree 28, the coil of relay 32T, a diode 48, and terminal 3 on relay tree 27 to negative. Positive voltage is applied to post 32 from the terminal 1A through contact 32T to the post 32. When the gun 15 touches post 32, relay VE picks up again. Relay T picks up and opens air valve 47 to operate gun. Relay SW2 picks up and locks in. Relay T drops out after time interval and shuts off gun. Relay SW3 picks up. If the wire is connected correctly between posts 11 and 32, current will flow from terminal 1A through contact 32T, post 32, the wire, post 11, contact 11F, terminal ϕA, contact SW1 and the coil of the test relay TS to negative. Both relays TS and SW3 are up, thereby energizing the reader advance relay RA to advance the tape reader 16 to the next wiring information. Break contacts on RA also drop out the control circuitry to recycle the procedure.

If the wire is not connected correctly, the tape reader will not advance automatically. The wireman can remove the poorly connected wire, press the "Reset" button and repeat the wiring procedure with the tape reader in the same position. A "Manual Override Switch" is also provided to permit the tape reader to be advanced under manual control. Also, a manually operated "Test Switch" is provided to permit retesting a complete harness without going through the normal wiring sequence.

From the foregoing description, it is apparent that the invention provides a combined instructing and testing system which supplies visual information for the making of wiring connections on a harness board and testing the correctness of each connection as it is made. Thus, it is not necessary to test the wiring harness on a separate testing device after it is completed, thereby saving the expense of providing separate test equipment and also saving the time required to make the separate tests. The system is so constructed that it may be utilized for wiring apparatus of different types and having different numbers of terminals to be wired.

Since numerous changes may be made in the above-described construction and different embodiments of the invention may be made without departing from the spirit and scope thereof, it is intended that all subject matter contained in the foregoing description or shown in the accompanying drawings shall be interpreted as illustrative and not in a limiting sense.

We claim as our invention:

1. Apparatus for making and testing a wire harness comprising a harness board having terminals thereon, connectors removably disposed on the terminals, indicating means adjacent the connectors, an information unit having wiring information thereon, a reader through which the information unit is read, control means cooperating with the reader for controlling the energization of the indicating means and the terminal for the connector to be wired, and a wiring tool energized through said terminal for connecting one end of a wire to the connector.

2. Apparatus for making and testing a wire harness comprising a harness board having terminals thereon, connectors removably disposed on the terminals, indicating means adjacent the connectors, an information unit having wiring information thereon, a reader through which the unit is read, control means cooperating with the reader for controlling the energization of the indicating means and the terminal for the connector to be wired, a wiring tool energized through said terminal for connecting one end of a wire to the connector, and additional indicating means energized after the energization of said tool for indicating the connector to which the other end of the wire is to be connected.

3. Apparatus for making and testing a wire harness comprising a harness board having terminals thereon, plug connectors removably disposed on the terminals, indicating means adjacent the plug connectors, a tape having wiring information thereon, a tape reader through which the tape is moved, control means cooperating with the tape reader for controlling the energization of the indicating means and the terminal for the connector to be wired, a wiring tool energized through said terminal for connecting one end of a wire to the connector, additional indicating means energized after the energization of said tool for indicating the connector to which the other end of the wire is to be connected, and additional control means energized through said wire for controlling the movement of the tape through the reader.

4. In a system for making and testing a wire harness, in combination, a harness board having a plurality of connectors removably disposed thereon, each connector having a plurality of terminal posts in a prearranged pattern, an indicating light on the harness board adjacent each connector, a pattern board having indicating lights thereon in a pattern corresponding to the pattern of the terminal posts on the connectors, an information unit having wiring information thereon, a reader for reading said information, control means cooperating with the reader to control the energization of the lights to indicate a terminal post to be wired, and a wiring tool energized through said post for connecting one end of a wire to the post.

5. In a system for making and testing a wire harness, in combination, a harness board having a plurality of connectors removably disposed thereon, each connector having a plurality of terminal posts in a prearranged pattern, an indicating light on the harness board adjacent each connector, a pattern board having indicating lights thereon in a pattern corresponding to the pattern of the terminal posts on the connectors, an information unit having wiring information thereon, a reader for reading said information, control means cooperating with the reader to control the energization of the lights to indicate a terminal post to be wired, and a wiring tool energized through said post for connecting one end of a wire to the post, timing control means maintaining said tool energized for a predetermined time interval, and relay means cooperating with the timing control means to deenergize the tool if it is removed from the post before the expiration of the time interval.

6. In a system for making and testing a wire harness, in combination, a harness board having a plurality of plug connectors removably disposed thereon, each connector having a plurality of terminal posts in a prearranged pattern, an indicating light on the harness board adjacent each connector, a wiring tool, a pattern board carried by the tool and having indicating lights thereon in a pattern corresponding to the pattern of the terminal posts on the connectors, a tape having wiring information thereon, a tape reader through which the tape is moved, control means cooperating with the tape reader to control the energization of the lights to indicate a terminal post to be wired, and said wiring tool being energized by contacting said post to connect one end of a wire to the post.

7. In a system for making and testing a wire harness, in combination, a harness board having a plurality of connectors removably disposed thereon, each connector having a plurality of terminal posts in a prearranged pattern, an indicating light on the harness board adjacent each connector, a wiring tool, a pattern board carried by the tool and having indicating lights thereon in a pattern corresponding to the pattern of the terminal posts on the connectors, an information unit having wiring information thereon, a reader through which the unit is read, control means cooperating with the reader to control the energization of the lights to indicate a terminal post to be wired, said wiring tool being energized by contacting said post to connect one end of a wire to the post, and the indicating lights for another connector and terminal post being energized a predetermined time after the energization of the tool to indicate the post to which the other end of the wire is to be connected.

8. In a system for making and testing a wire harness, in combination, a harness board having a plurality of connectors removably disposed thereon, each connector having a plurality of terminal posts in a prearranged pattern, an indicating light on the harness board adjacent each connector, a wiring tool, a pattern board carried by the tool and having indicating lights thereon in a pattern corresponding to the pattern of the terminal posts on the connectors, an information unit having wiring information thereon, a reader through which the unit is read, control means cooperating with the reader to control the energization of the lights to indicate a terminal post to be wired, said wiring tool being energized by contacting said post to connect one end of a wire to the post, the indicating lights for another connector and terminal post being energized a predetermined time after the energization of the tool to indicate the post to which the other end of the wire is to be connected, and switching means for applying voltages to said terminal posts to test continuity of the circuit through said wire.

9. In a system for making and testing a wire harness, in combination, a harness board having a plurality of connectors removably disposed thereon, each connector having a plurality of terminal posts in a prearranged pattern, an indicating light on the harness board adjacent each connector, a wiring tool, a pattern board carried by the tool and having indicating lights thereon in a pattern corresponding to the pattern of the terminal posts on the connectors, a tape having wiring information thereon, a tape reader through which the tape is moved, control means cooperating with the tape reader to control the energization of the lights to indicate a terminal post to be wired, said wiring tool being energized by contacting said post to connect one end of a wire to the post, the indicating lights for another connector and terminal post being energized a predetermined time after the energization of the tool to indicate the post to which the other end of the wire is to be connected, and switching means for testing the continuity of the circuit through said wire to control the movement of the tape through the reader.

10. The method of wiring a plurality of terminals distributed over a region with a terminal wiring tool which comprises illuminating part only of the region adjacent a first terminal, connecting a source of energy to the wiring tool by a circuit completed by connection of the wiring tool to the first terminal, and maintaining the wiring tool in position to connect a wire to the first terminal.

11. In a method as claimed in claim 10, the subsequent steps of illuminating a second part only of the region adjacent a second terminal, connecting a source of energy to the wiring tool by a circuit completed by connection of the wiring tool to the second terminal, and maintaining the wiring tool in position to connect a wire to the second terminal.

12. In a method as claimed in claim 11, the subsequent step of applying a voltage across the first and second terminals to check the continuity of the circuit therebetween, and thereafter connecting a wire to a third terminal.

13. The method as claimed in claim 11 wherein said illuminating comprises a first step of illuminating an area representative of a plurality of said terminals including said first terminal, and a second step of illuminating in an area representing said plurality of terminals only that portion which corresponds to said first terminal.

14. In a system for making and testing a wire harness, a harness board having a plurality of connectors removably disposed thereon, each of said connectors having a plurality of terminals in a prearranged pattern, a plurality of terminal indicating lights including an indicating light on the harness board adjacent each of said connectors, a wiring tool for connecting wire ends to said terminals, an information unit having wiring information recorded thereon for different connections to be made, an information reader for successively reading the recorded information, and control means responsive to information read by the reader for energizing certain of said indicating lights to indicate a first one of said terminals to be wired, said control means establishing an energizing circuit for the wiring tool which is completed by contact between the wiring tool and only the indicated one of said terminals, said control means including means responsive to information read by said reader, for energizing certain of said lights to indicate a second one of the terminals to be wired and for establishing an energizing circuit for the wiring tool which is completed by contact between the wiring tool and only the second one of the terminals, said control means comprising continuity means responsive to continuity of a wire connection between said first and second terminals for operation from a first to a second condition, and said control means comprising means responsive to operation of the continuity means to said second condition for conditioning the reader and control means for energizing certain of said lights to indicate a third one of said terminals to be wired and for establishing an energizing circuit for the wiring tool which is completed by contact between the tool and only the third one of said terminals.

15. A system as claimed in claim 14 in combination with means operable for resetting the control means to reestablish an energizing circuit for the wiring tool previously established by the control means in order to rewire said first and second terminals and for repeating an operation of the continuity means to check continuity of the rewired connection between the first and second terminals.

16. A system as claimed in claim 15 in combination with manually-operable means for causing said control means to indicate a fourth one of the terminals and to establish an energizing circuit for the wiring tool which is completed by contact between the wiring tool and only fourth terminal.

References Cited

UNITED STATES PATENTS

| | | | |
|---|---|---|---|
| 1,738,710 | 12/1929 | Jones | 324—66 |
| 3,163,926 | 1/1965 | Gray | 29—203 |
| 3,222,597 | 12/1965 | Beatenbough et al. | 324—73 |
| 3,259,968 | 7/1966 | Dyksterhouse | 29—407 X |

THOMAS H. EAGER, *Primary Examiner.*